United States Patent
McFetridge

(10) Patent No.: US 7,139,355 B2
(45) Date of Patent: Nov. 21, 2006

(54) METHOD OF OPERATING A NUCLEAR POWER PLANT AT MULTIPLE POWER LEVELS

(75) Inventor: Robert H. McFetridge, Level Green, PA (US)

(73) Assignee: Westinghouse Electric Co, LLC, Pittsburgh, PA (US)

( * ) Notice: Subject to any disclaimer, the term of this patent is extended or adjusted under 35 U.S.C. 154(b) by 130 days.

(21) Appl. No.: 10/677,184

(22) Filed: Oct. 2, 2003

(65) Prior Publication Data

US 2004/0071253 A1 Apr. 15, 2004

Related U.S. Application Data

(62) Division of application No. 10/252,496, filed on Sep. 23, 2002, now Pat. No. 6,674,826.

(51) Int. Cl.
*G21C 17/00* (2006.01)
(52) U.S. Cl. ............... 376/259; 376/245; 376/254; 376/216; 376/219
(58) Field of Classification Search .............. 376/214, 376/215–218, 219, 236, 241, 245, 254, 259, 376/267, 318
See application file for complete search history.

(56) References Cited

U.S. PATENT DOCUMENTS 4,279,698 A * 7/1981 Doi et al. .................. 376/236
4,333,797 A * 6/1982 Nishizawa ................. 376/210
5,428,653 A * 6/1995 El-Genk .................... 376/318

OTHER PUBLICATIONS

McGraw-Hill Series in Nuclear Engineering, p. 374-380, 1961.*

* cited by examiner

*Primary Examiner*—Ricardo Palabrica

(57) ABSTRACT

A method of operating a nuclear power plant includes determining and licensing a maximum power level at which the power plant can be operated subsequent to the beginning of a fuel cycle, and with the power plant being operated at less than its maximum power rating at certain times such as at the beginning of a fuel cycle. The maximum power level is greater than the power level that would be calculated based upon an assumption that the heat flux peaking factor ($F_Q$) and enthalpy rise peaking factor ($F_{\Delta H}$) remain at their maximum level throughout an entire fuel cycle. The maximum power rating takes advantage of factors such as known reductions in $F_Q$ and $F_{\Delta H}$ at certain points in the fuel cycle, the marginal additional capacity of the Balance Of Plant, and the occasional optimization of process parameters such as ultimate heat sink temperature and atmospheric conditions. The power plant may be operated at a substantially continuously variable power level based upon various factors of the power plant, but would not exceed the NRC licensed core thermal power level.

3 Claims, 3 Drawing Sheets

METHOD OF OPERATING A NUCLEAR POWER PLANT AT MULTIPLE POWER LEVELS

This is a division of Ser. No. 10/252,496 filed Sep. 23, 2002 now U.S. Pat. No. 6,674,826.

BACKGROUND OF THE INVENTION

1. Field of the Invention

The present invention relates generally to nuclear power plants and, more particularly, to a method of operating a nuclear power plant at multiple power levels during the course of a fuel cycle.

2. Description of the Related Art

The design and operation of nuclear power plants in the United States are highly regulated. The federal regulations regarding the licensing of nuclear power plants are set forth at 10 C.F.R. § 50. In applying for a license on a nuclear power plant from the Nuclear Regulatory Commission (NRC), one must set forth various operating parameters of the power plant, including the thermal power level at which the reactor will be operated and above which the reactor will not be permitted to be operated. In determining what will be the operating power of a nuclear reactor for purposes of obtaining a license, one must perform calculations that assume multiple simultaneous worst-case scenarios, even though many of such scenarios cannot, as a practical matter, exist simultaneously. As a general matter, therefore, power ratings of nuclear reactors in the United States are conservative with respect to the actual power capacity of such reactors.

As an additional matter, such calculations typically assume that certain conditions within the reactor are at their worst-case values, i.e., maximum or minimum values, at all times during the course of a fuel cycle of the reactor, when in fact such values can vary in a known fashion from the beginning of cycle to the end. Accordingly, such nuclear reactors operate at power levels below what could be achieved if the values of such conditions were considered as being variable and not fixed at their worst case levels.

Two examples of such variable values of reactor conditions are the heat flux peaking factor ($F_Q$) and the enthalpy rise peaking factor ($F_{\Delta H}$). It is known that $F_Q$ is typically at a maximum at the beginning of a fuel cycle and decreases with the depletion of the fuel rods of the reactor. It is also known that $F_{\Delta H}$ typically starts at an initial value and increases slightly in the initial stages of a fuel cycle but thereafter decreases with depletion of the fuel rods. Calculations that are performed in order to determine a power level at which a reactor will be licensed to operate are based on the assumption that the values of $F_Q$ and $F_{\Delta H}$ are fixed at their maximum levels, although such values are at a maximum for only a relatively short period of time during the fuel cycle.

A nuclear power plant is generally said to comprise a reactor and the Balance Of Plant (BOP), with the BOP including all of the apparatus that interacts with the reactor in order to generate electricity. It is also known that the various components of the BOP are designed to operate at a given operating level, but typically include an additional margin, whether as a factor of safety, a design excess in order to comply with rating requirements, or for other reasons. It is also known that various environmental factors can affect the performance of a nuclear power plant. For instance, a cooling tower may be designed to have a certain rated capacity at 80° F. and 90% relative humidity, and may be designed with a margin of an additional 2%. Accordingly, the cooling tower can operate at another 2% above its rated capacity at 80° F. and 90% relative humidity. On a winter day with a temperature of 20° F. and 10% relative humidity, however, the cooling tower may be operating at only 90% of its rated capacity to meet the cooling needs of the power plant. Accordingly, on such a winter day the cooling tower potentially could provide an additional 12% capacity. It thus can be seen that the performance conditions of the various components of the BOP, as well as the process parameters of the environment, can cause the BOP to have an additional aggregate capacity above and beyond what is needed when the reactor is operating at its rated power level. It thus would be desirable to take advantage of the excess capacity of the BOP, perhaps in conjunction with reductions in $F_Q$ and $F_{\Delta H}$ below their maximum values with the depletion of the fuel rods.

SUMMARY OF THE INVENTION

Accordingly, a method of operating a nuclear power plant includes determining and licensing a maximum power level at which the power plant can be operated subsequent to the beginning of a fuel cycle, and with the power plant being operated at less than its maximum power rating at certain times such as at the beginning of a fuel cycle. The maximum power level is greater than the power level that would be calculated based upon an assumption that the heat flux peaking factor ($F_Q$) and enthalpy rise peaking factor ($F_{\Delta H}$) remain at their maximum level throughout an entire fuel cycle. The maximum power rating takes advantage of factors such as known reductions in $F_Q$ and $F_{\Delta H}$ at certain points in the fuel cycle, the marginal additional capacity of the Balance Of Plant, and the occasional optimization of process parameters such as ultimate heat sink temperature and atmospheric conditions. The power plant may be operated at a substantially continuously variable power level based upon various factors of the power plant, but would not exceed the NRC licensed core thermal power level.

We provide a method of operating a nuclear power plant through a fuel cycle by operating the plant at an initial power level during a first portion of the fuel cycle, and by operating the plant at an enhanced power level during a second portion of the fuel cycle. The initial power level typically will be based upon the maximum values of $F_Q$ and $F_{\Delta H}$ that are calculated for a given reactor core configuration. The enhanced power level is higher than the initial power level and is based at least in part upon the known fact that $F_Q$ generally decreases throughout a fuel cycle and that the $F_{\Delta H}$ reaches a maximum in the beginning stages of the fuel cycle but thereafter decreases with depletion of the fuel rods. Formulas set forth below describe a manner in which the $F_Q$ and $F_{\Delta H}$ can be calculated. Other formulas set forth a manner in which reduced values of $F_Q$ and $F_{\Delta H}$ at which the power plant can be operated at an enhanced power level are calculated.

The enhanced power level may be determined, at least in part, upon a maximum power level. The maximum power level may, at least in part, be based upon an assumption that at least one performance condition of the plant is at a maximum level and/or that at least one process parameter of the plant or its environment is in an optimum condition. The enhanced power level may vary between the initial power level and the maximum power level depending upon prevailing performance conditions and process parameters.

The enhanced power level may be a substantially continuously variable power level in which the power level at any given moment is based at least in part upon a corresponding $F_Q$ and/or a corresponding $F_{\Delta H}$.

One method in accordance with the present invention of operating a nuclear power plant through a fuel cycle of a core of a reactor of the plant, with the core including a plurality of fuel rods in communication with a plurality of channels, and with a coolant flowing through the channels, can be generally stated as including operating the plant at an initial power level during a first portion of the fuel cycle, the initial power level being based at least in part upon at least one of a maximum value of a heat flux peaking factor of the core and a maximum value of an enthalpy rise peaking factor of the core, and operating the plant at an enhanced power level during a second portion of the fuel cycle, the enhanced power level being higher than the initial power level, the enhanced power level being based at least in part upon at least one of a reduced value of the heat flux peaking factor of the core and a reduced value of the enthalpy rise peaking factor of the core. The reduced values of the heat flux peaking factor and the enthalpy rise peaking factor result from the progressive depletion of the core during the fuel cycle.

Another method in accordance with the present invention operating a nuclear power plant through a fuel cycle of a core of a reactor of the plant, with the core including a plurality of fuel rods, can be generally stated as including determining an initial power level based at least in part upon at least a first design limitation of the plant and at least one of a maximum value of a heat flux peaking factor of the core and a maximum value of an enthalpy rise peaking factor of the core, determining a maximum power level based at least in part upon at least one of an assumption that at least a first performance condition of the plant is at a maximum level and an assumption that at least a first process parameter is at an optimum condition, the maximum power level being greater than the initial power level, determining a reduced value of the heat flux peaking factor of the core based upon the maximum value of the heat flux peaking factor, the initial power level, and the maximum power level, determining a reduced value of the enthalpy rise peaking factor of the core based upon the maximum value of the enthalpy rise peaking factor, the initial power level, and the maximum power level, determining the one of the heat flux peaking factor and the enthalpy rise peaking factor that will achieve chronologically last the reduced value of the heat flux peaking factor and the reduced value of the enthalpy rise peaking factor, respectively, during the fuel cycle, operating the plant at the initial power level during a first portion of the fuel cycle, determining the one of the heat flux peaking factor and the enthalpy rise peaking factor of the core, and operating the plant at an enhanced power level between the initial and maximum power levels during a second portion of the fuel cycle upon the one of the heat flux peaking factor and the enthalpy rise peaking factor achieving the reduced value of the heat flux peaking factor and the reduced value of the enthalpy rise peaking factor, respectively. The reduced values of the heat flux peaking factor and the enthalpy rise peaking factor result from the progressive depletion of the core during the fuel cycle.

Another method in accordance with the present invention of operating a nuclear power plant through a fuel cycle of a core of a reactor of the plant can be generally stated as including determining a maximum power level for the reactor, obtaining a license to operate the reactor at the maximum power level, operating the reactor at an initial power level less than the maximum power level during a first part of the fuel cycle, and operating the reactor at an enhanced power level during a second part of the cycle, the enhanced power level being between the initial power level and the maximum power level, with the increase in power level from the initial level to the enhanced power level being based at least in part upon the progressive depletion of the core during the fuel cycle.

BRIEF DESCRIPTION OF THE DRAWINGS

A further understanding of the invention can be gained from the following Description of the Preferred Embodiments when read in conjunction with the accompanying drawings in which.

Similar numerals refer to similar parts throughout the specification.

DESCRIPTION OF THE PREFERRED EMBODIMENTS

Figure 1:
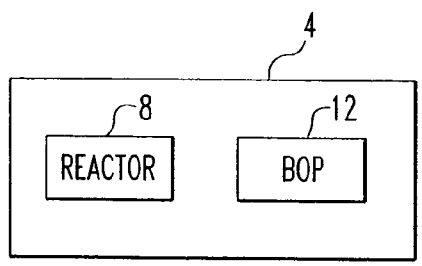
FIG. 1 is a schematic depiction of a nuclear power plant that can be operated in accordance with the present invention.

A typical nuclear power plant 4 is depicted schematically in FIG. 1. As is understood in the relevant art, the nuclear power plant 4 includes a nuclear reactor 8 and a Balance of Plant (BOP) 12. The reactor 8 includes a core and generates heat in a known fashion that is supplied to the BOP 12 in order to generate electricity from the heat. The BOP 12 can be generally stated as including all of the components of the plant 4 other than the reactor 8 that are employed in the generation of electricity.

Figure 2:
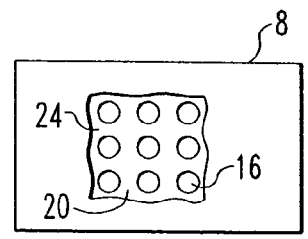
FIG. 2 is an enlarged schematic view of a portion of a reactor of the nuclear power plant.

As is understood in the relevant art, the reactor 8, as is depicted schematically in FIG. 2, includes a plurality of fuel rods 16 that are arranged in a grid pattern with a plurality of channels 20 extending between the fuel rods 16. A coolant 24 such as water that may contain a moderator such as boron flows through the channels 20 in contact with the fuel rods 16. The fuel rods 16 include a fissionable material such as enriched uranium and undergo a known fission reaction whereby heat is generated within the rods 16 and is transferred to the coolant 24. If the reactor 8 is a so-called Pressurized Water Reactor, the coolant 24 will be maintained at a given pressure within the core to avoid boiling. If the reactor 8 is a so-called Boiling Water Reactor, portions of the coolant 24 flash to a vapor such as steam due to contact with the fuel rods 16.

It is also known that the fuel rods 16 disposed at the center of the reactor 8 include fissionable material that is enriched to a greater degree than the fissionable material within the fuel rods 16 that are spaced from the central regions of the reactor 8. As such, the degree of enrichment of the fissionable material typically declines when measured from the fuel rods 16 at the center of the reactor 8 going toward the fuel rods 16 at the periphery of the reactor 8. Accordingly, the fuel rods 16 in the central regions of the reactor 8 typically are at a higher temperature than the fuel rods 16 at the periphery of the reactor 8 during operation of the reactor 8. Such variation in the temperature of the fuel rods 16 accordingly results in variations in heat flux Q and enthalpy rise ΔH at different locations within the reactor 8. The variation in the heat flux Q across the core of the reactor 8 can be expressed as a heat flux peaking factor $F_Q$ that can be calculated by the following equation:

$$F_Q = (Q_{PEAK}/A_{PEAK})/(Q_{TOT}/A_{TOT}), \text{ where}$$

$F_Q$=the heat flux peaking factor;
$Q_{PEAK}$=the heat flow from the fuel rod with the greatest heat generation rate;
$A_{PEAK}$=the surface area of the fuel rod with the greatest heat generation rate;
$Q_{TOT}$=the total heat flow from the core; and
$A_{TOT}$=the total surface area of the fuel rods.

The variation in enthalpy rise ΔH due to the variation of the heat production of the fuel rods 16 can be expressed as an enthalpy rise peaking factor $F_{\Delta H}$ which can be calculated according to the equation:

$$F_{\Delta H} = (Q/W)_{PEAK}/(Q/W)_{AVG}, \text{ where}$$

$F_{\Delta H}$=the enthalpy rise peaking factor;
Q=the heat generation rate of a fuel rod with respect to a flow channel;
W=the flow rate of the coolant through the channel; whereby
$(Q/W)_{PEAK}$=the peak ratio of Q/W; and
$(Q/W)_{AVG}$=the average ratio of Q/W.

Figure 3:
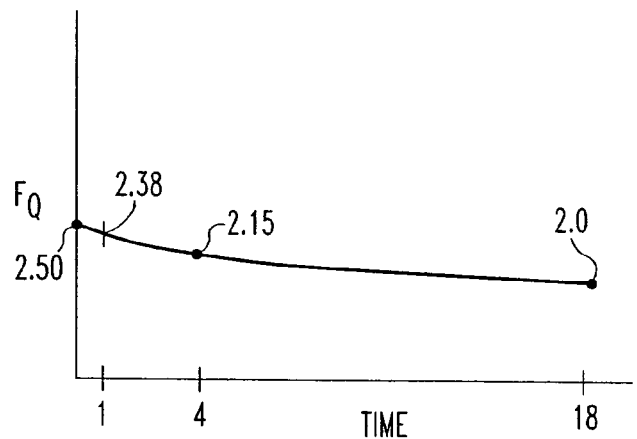
FIG. 3 is a graph depicting the value of the heat flux peaking factor ($F_Q$) as a function of time during the course of a fuel cycle.

As can be understood from FIG. 3, and as is known in the relevant art, the $F_Q$ of the reactor 8 typically is at a maximum at the beginning of a fuel cycle and immediately begins to decrease with the progress of the fuel cycle. The $F_Q$ of the reactor 8 continues to decrease with the progressive depletion the fuel rods 16 of the core over time. It can be seen that the $F_Q$ typically decreases at the greatest rate at the beginning of the fuel cycle compared with later in the fuel cycle.

Figure 4:
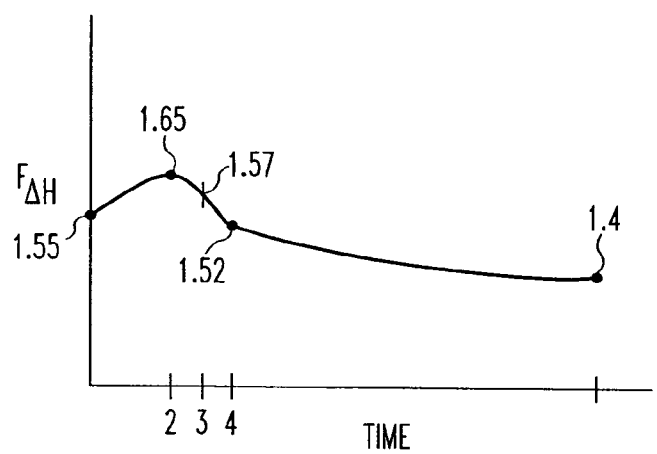
FIG. 4 is a graph depicting the value of the enthalpy rise peaking factor ($F_{\Delta H}$) as a function of time during the course of the fuel cycle.

As can best be seen in FIG. 4, and as is known in the relevant art, the $F_{\Delta H}$ typically increases slightly from an initial value at the beginning of a fuel cycle to a maximum value in the early stages of the fuel cycle. After reaching its maximum value, the $F_{\Delta H}$ thereafter decreases throughout the rest of the fuel cycle as the fuel rods 16 of the core become depleted over time.

Previously known methods of operating a nuclear power plant have relied upon calculations based upon an assumption that the $F_Q$ and $F_{\Delta H}$ remained at their maximum values throughout the entire duration of a fuel cycle. As will be set forth below in greater detail, the method of the present invention takes advantage of a margin of power capacity above a power rating that might have been calculated based upon an assumption that the $F_Q$ and $F_{\Delta H}$ remain fixed at their maximum values throughout the entire duration of the fuel cycle.

Figure 5:
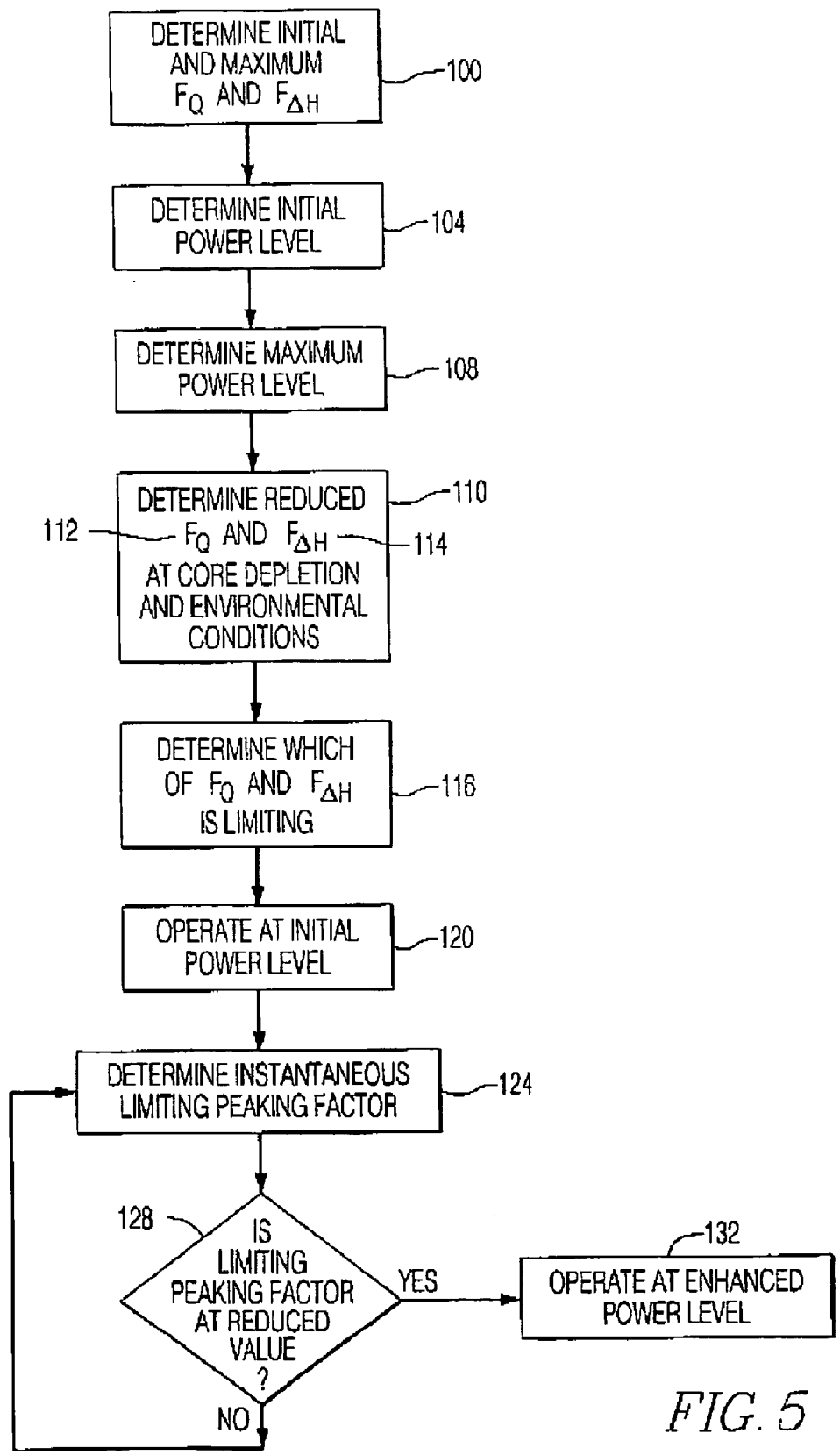
FIG. 5 is a flow chart depicting a method of operating the nuclear power plant in accordance with a first embodiment of the present invention.
Figure 6:
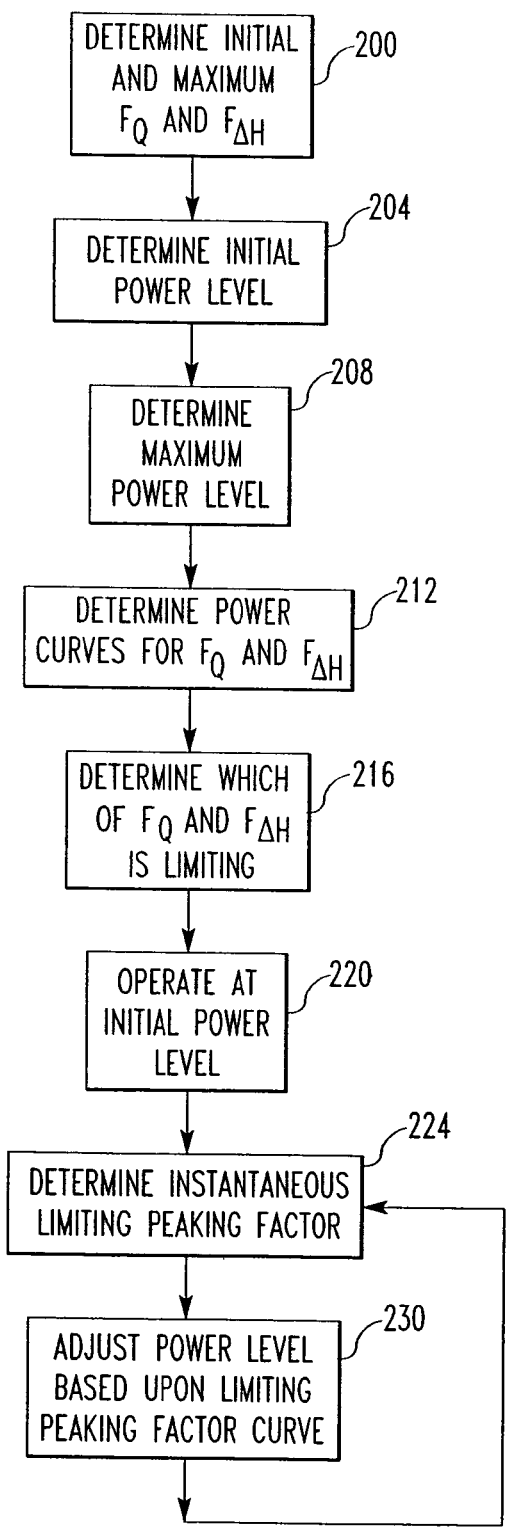
FIG. 6 is a flow chart depicting a method of operating the nuclear power plant in accordance with a second embodiment of the present invention.

The method of the present invention is described below and depicted in FIGS. 5 and 6 as being generally of two embodiments. The first embodiment, depicted generally in FIG. 5, can be generally stated as providing a step in the power level of the power plant 4 upon reaching certain conditions within the reactor 8. The second embodiment, depicted generally in FIG. 6, is similar to the first embodiment but varies the power level on a substantially continuous basis according to conditions such as $F_Q$ and/or $F_{\Delta H}$ within the reactor 8 instead of providing a single step increase in the power level. Accordingly, it will be understood that the two embodiments described below generally relate to the same concept that is implemented in slightly different fashions in the two embodiments.

Regarding the first embodiment (FIG. 5), the first step 100 is to determine the initial $F_Q$ and $F_{\Delta H}$ that will exist within the reactor 8 at the beginning of the fuel cycle, as well as the maximum values of $F_Q$ and $F_{\Delta H}$ that will occur during the course of the fuel cycle. Such values for the initial and maximum $F_Q$ and $F_{\Delta H}$ can be calculated in a known fashion based upon the specific configuration of the core and the variation of the degree of enrichment of the fissionable material in the various fuel rods 16 of the reactor 8.

The next step 104 is to determine an initial power level of the plant 4 based upon the initial values of $F_Q$ and $F_{\Delta H}$ determined in the step 100, as well as other factors pertinent to the plant 4 and also in accordance with the applicable requirements of 10 CFR § 50 and other applicable regulations. The initial power level is determined by employing known calculations and will be the power level at which the plant 4 is operated at the beginning of the fuel cycle. As used herein, the expression "power level" may refer, for example, to a thermal power level, an electrical power level, or both depending upon the context in which such expression is used.

The next step 108 is to determine the maximum power level of the plant 4. The plant 4 will have been designed with a number of design limitations, such as rated capacities for pumps and condensers, with such design limitations often including a margin of additional performance that may be based upon safety factors, in order to ensure compliance with rated capacities, or for other reasons. During operation of the plant 4, the actual performance conditions of various components of the BOP 12 may be the same as or slightly different than the original corresponding design limitations.

The theoretical design limitations of the various components of the BOP 12, as well as the calculated initial power level, are typically calculated according to assumed boundary conditions of the environment around the plant 4, such as the ambient temperature, the atmospheric pressure, the relative humidity, and the ultimate heat sink temperature, as well as other conditions. As is known in the relevant art, the ultimate heat sink temperature typically refers to the temperature of the source of the cooling medium, whether it is a body of water or another source of a cooling medium, for the secondary loop of the reactor 8.

During operation of the plant 4, the actual observed process parameters can vary substantially from the corresponding initially assumed boundary conditions. The maximum power level 108 will be calculated in a known fashion specifically for the individual plant 4 and will be based upon, among other factors, the performance margin of the BOP 12 based upon the difference between the observed performance conditions and the upper margins of the design limitations, as well as the difference between the process parameters that may vary on a daily basis and the boundary conditions that were assumed in calculating the initial power level 104.

It is understood, however, that the maximum power level 108 cannot exceed certain practical or legal limitations or other applicable limitations. For instance, the maximum power level 108 cannot be a thermal power level that would exceed the electrical capacity of a connected generator or electrical grid. Other limitations might include a maximum temperature for the ultimate heat sink that cannot be exceeded, a maximum site thermal discharge level, and/or a maximum temperature differential between the inlet and outlet flows of the secondary loop with respect to an ultimate heat sink, as well as other limitations.

The next step 110 is to determine reduced values for $F_Q$ 112 and $F_{\Delta H}$ 114 that will occur at some time subsequent to the beginning of the fuel cycle and that will provide an indication of the point in the fuel cycle at which the power level may be and likely will be increased from the initial power level 104 to an enhanced power level between the initial power level 104 and the maximum power level 108. The reduced value of the $F_Q$ 112 is calculated according to the following equation:

$$F_{QR} = F_{QMAX} * P1/P2, \text{ where}$$

$F_{QR}$=the reduced heat flux peaking factor 112;
$F_{QMAX}$=the maximum heat flux peaking factor;
P1=the power output of the plant at the initial power level 104; and
P2=the power output of the plant at the maximum power level 108.

The reduced value of the $F_{\Delta H}$ 114 is calculated according to the following equation:

$$F_{\Delta HR} = F_{\Delta HMAX} * P1/P2, \text{ where}$$

$F_{\Delta HR}$=the reduced enthalpy rise peaking factor 114;
$F_{\Delta HMAX}$=the maximum enthalpy rise peaking factor;
P1=the power output of the plant at the initial power level 104; and
P2=the power output of the plant at the maximum power level 108.

In effect, the peak $F_Q$ and $F_{\Delta H}$ are reduced by the amount of margin in the power level between the maximum power level 108 and the initial power level 104 to calculate the reduced values of $F_Q$ and $F_{\Delta H}$. It will typically be the case, however, that either the $F_Q$ or the $F_{\Delta H}$ will be more limiting than the other in the following fashion, which is step 116.

As can be seen in the exemplary graphs of FIGS. 3 and 4, the $F_Q$ may be at a peak value of 2.50 at the beginning of the fuel cycle. The $F_{\Delta H}$ may be at a peak of 1.65 at month 2 of the fuel cycle. If, for example, the maximum power level 108 is determined to be 105% of the original power level 104, the reduced value of the $F_Q$ ($F_{QR}$) from the equation above is 2.38, which may occur approximately at month 1 of the fuel cycle, as is shown in FIG. 3. The reduced value of the $F_{\Delta H}$ ($F_{\Delta HR}$) based upon the hypothetical maximum power level 108 being 105% of the initial power level 104 is 1.57 which, as is depicted in FIG. 4, may occur at month 3 of the fuel cycle. In accordance with the method of the present invention, the power level of the plant 4 will be increased from the initial power level 104 at the point in the fuel cycle at which the last of the $F_Q$ and the $F_{\Delta H}$ has reached its reduced value. In the example provided in FIGS. 3 and 4, this time would be three months into the fuel cycle, since the $F_Q$ would have already reached its reduced value of 2.38 at month 1 of the fuel cycle and would have decreased even further by month three. In the example provided in FIGS. 3 and 4, therefore, the $F_{\Delta H}$ is said to be limiting in that the $F_{\Delta H}$ takes longer to decrease to its reduced value than the $F_Q$. To this point, all of the aforementioned steps in the instant method have been theoretical calculation steps performed prior to operation of the plant 4.

After all of the aforementioned calculations have been performed, the plant 4 is put into operation. Specifically, the reactor 8 is operated at the initial power level 104, as is indicated in the step 120 of FIG. 5. During continued operation of the plant 4, whichever of the $F_Q$ and $F_{\Delta H}$ were found to be limiting are tested regularly, as is depicted in the step 124 of FIG. 5. In step 128, control circuitry compares the tested instantaneous value 124 with the calculated limiting reduced value of $F_Q$ 112 or $F_{\Delta H}$ 114 to determine if the fuel rods 16 of the reactor 8 have depleted to the point that the limiting reduced peaking factor 112 or 114 has been reached. If not, the instantaneous peaking factor is re-tested regularly and is compared with the limiting reduced peaking factor 112 or 114 until such time as the limiting reduced peaking factor 112 or 114 is reached.

At such time, the power level of the reactor 8 is increased from the initial power level 104 to an enhanced power level 132. The increase in power typically may be provided, at least in part, by a reduction in a moderator such as boron in the coolant 24 of the reactor 8. The enhanced power 132 is a power level between the initial power level 104 and the maximum power level 108 and, depending upon the current process parameters and the performance conditions, may be equal to the initial power level 104 or the maximum power level 108. In this regard, it is understood, that the maximum power level 108 refers to the maximum theoretical power that can be achieved by the plant 4 in the event that all of the process parameters are at either a minimal or an optimum level, as appropriate, and all of the performance conditions are at their maximum levels. Since such circumstances typically will not occur, the enhanced power level 132 typically is at a level between the initial power level 104 and the maximum power level 108.

Occasionally, the maximum power level 108 will be the maximum theoretical power that can be achieved by the plant 4 when the process parameters are at a minimal level. For example, in circumstances where a plant operates at a reduced thermal efficiency because the environmental conditions (such as a prolonged drought coupled with an abnormally low water level in the plant's cooling water source) are significantly more adverse than the design values for the plant, the reactor operating conditions (e.g., power level) could be modified to maximize the plant power output.

During operation of the reactor 8 at the enhanced level 132, the instantaneous $F_Q$ and $F_{\Delta H}$ are regularly determined from measurements to ensure that neither exceeds its calculated reduced value 112 and 114. If the determined $F_Q$ or $F_{\Delta H}$ exceed the calculated reduced values 112 or 114 thereof, the power level of the reactor 8 must be decreased.

In the absence of a circumstance requiring a reduction in the power level of the reactor 8, the reactor 8 and thus the plant 4 continue to operate at the enhanced power level 132 for the duration of the fuel cycle. It thus can be seen that the plant 4 is operated at the initial power level 104 for a first portion of the fuel cycle, and is operated at the enhanced level 132 during a second portion of the fuel cycle. Operation of the reactor at the enhanced power level 132 provides extra thermal and electrical output from the plant 4 that would not have been achieved had the plant 4 operated at the initial power level 104 for the entire duration of the fuel cycle.

In practicing the method of the present invention, it is contemplated that a license for the plant 4 will be sought at the maximum power level 108 instead of at initial power level 104. For such a license, the plant 4 will be operated at a reduced level below the licensed power level during the first portion of the fuel cycle, with the power level then being increased to the licensed power level at the point in the fuel cycle when the limiting reduced peaking factor 112 or 114 is reached. In this regard, with the maximum power 108 being the licensed power level, the plant 4 will be operating at a reduced level during the first portion of the fuel cycle, and will reach the licensed power level during the second portion of the fuel cycle only on those days in which the process parameters are at their optimum levels and the performance conditions are at their maximum levels. Overall, however, the net thermal and electrical power obtained from the plant 4 is advantageously increased by employing the method described herein.

The second method of operating a nuclear power plant 4 is depicted generally in FIG. 6. It can be seen that many of the steps are the same as the first method. For instance, the initial and maximum $F_Q$ and $F_{\Delta H}$ 200, the initial power level 204, and the maximum power level 208 are calculated in the same fashion. However, instead of determining reduced values for $F_Q$ and $F_{\Delta H}$ that are fixed and determined based upon an assumption that the power level of the plant 4 will receive a step increase from the initial power level 104 toward the maximum power level 108, the second method provides power curves in step 212 for each of $F_Q$ and $F_{\Delta H}$. In this regard, the power curves would be reverse-calculated from the ratio of each given $F_Q$ and the maximum calculated $F_Q$ and according to the ratio of each given $F_{\Delta H}$ and the maximum $F_{\Delta H}$.

After the $F_Q$ and $F_{\Delta H}$ power curves have been plotted, either the $F_Q$ or the $F_{\Delta H}$ will be determined to be limiting, as in step 216. In this regard, the $F_Q$ and $F_{\Delta H}$ may each be the limiting factor at different points in the fuel cycle. Specifically, the plant 4 will be operated at the lower of the value of the $F_Q$ power curve and the $F_{\Delta H}$ power curve at a given point in the fuel cycle. Again, the foregoing steps of the second method are in the form of calculations that are performed prior to operation of the plant 4.

The plant 4 is then operated at the initial power level 220 and the limiting peaking factor 224 is determined on a regular basis. Depending upon the corresponding power level indicated by the $F_Q$ and the $F_{\Delta H}$ curves, the power level of the plant 4 is adjusted with a closed loop control system according to the determined limiting peaking factor, as is indicated generally in the step 230.

From both a practical and a legal standpoint, however, it may be desirable for the power level of the plant 4 to not be controlled by a closed loop control system and to rather be ultimately controlled by human beings. In this regard, the method of the second embodiment may include the adjustment step 230 being performed by appropriate personnel based upon an indication by the system of the desirable power level based upon the limiting instantaneous peaking factor from step 224. It may also be desirable for the comparison step 128 to be performed manually by humans and/or for some or all of the testing or calculation to be performed by humans. Such a practice would provide a power level for the plant 4 that is substantially continuously variable.

The second method thus has the potential to provide even more net power from the plant 4 during a fuel cycle since the power level of the plant 4 is varied substantially continuously to maintain the highest enhanced power level possible at substantially each point in the fuel cycle.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of operating a nuclear power plant through a fuel cycle of a core of a reactor of the plant, the method comprising:
   determining a maximum power level for the reactor;
   obtaining a Nuclear Regulatory Commission license to operate the reactor at the maximum power level;
   operating the reactor at an initial power level less than the maximum power level during a first part of the fuel cycle; and
   operating the reactor at an enhanced power level during a second part of the cycle, the enhanced power level being between the initial power level and the maximum power level;
   the increase in power level from the initial level to the enhanced power level being based upon heat flux peaking factor and the enthalpy rise peaking factor values at the core depletion and environmental conditions.

2. The meted as set forth in claim 1, wherein the step of operating the reactor at an enhanced power level during a second part of the cycle comprises operating the reactor at a substantially continuously variable enhanced power level.

3. The method as set forth in claim 1, wherein the step of operating the reactor at an enhanced power level during the second part of the cycle comprises operating the reactor at the licensed power level.

* * * * *